UNITED STATES PATENT OFFICE.

ALBERT WOLFF, OF COLOGNE, GERMANY, ASSIGNOR TO (MRS.) MARIA STEINKRÜGER, NÉE ENGELSKIRCHEN, OF COLOGNE-BICKENDORF, GERMANY.

PREPARATION OF FORMIC ESTERS.

1,039,875.      Specification of Letters Patent.      Patented Oct. 1, 1912.

No Drawing.      Application filed June 25, 1912. Serial No. 705,683.

*To all whom it may concern:*

Be it known that I, ALBERT WOLFF, a citizen of the German Empire, and residing at Cologne-on-the-Rhine, in the Kingdom of Prussia and Empire of Germany, have invented certain new and useful Improvements in Preparation of Formic Esters, of which the following is a specification.

Esters of formic acid are as a rule prepared by treating formic acid with an alcohol in the presence of a water binding substance. I have found that such esters can be prepared from sodium formate the price of which is much lower than that of formic acid.

It was Liebig who suggested a process for the preparation of ethyl formate by distilling a mixture of sulfuric acid, ethyl alcohol and sodium formate (see Beilstein, *Handbook of Organic Chemistry*, vol. I, page 395). However, by that method the yield is less than 80% of the theory and besides the product is strongly acid. My experiments have shown, that a formic ester of neutral reaction can be obtained with a nearly theoretical yield, if a mixture of sodium formate, alcohol and sodium bisulfate be heated. The esters boiling below 100° C. can be separated by distillation at atmospheric pressure, whereas with esters boiling above 100° C., for example isoamyl formate, a distillation under reduced pressure becomes necessary, because by a distillation at atmospheric pressure a decomposition sets in, if sodium bisulfate be present.

Example 1: 32 parts by weight of methyl alcohol (1 mol.) are heated with 68 parts of pulverized sodium formate (1 mol.) and 240 parts of very finely powdered sodium bisulfate (2 mol.) in a closed vessel for about 10 hours up to a temperature of 80° C., the mass being stirred all the while. The mixture may also be slowly boiled in a bottle with a reflux cooler for about 10 hours whereupon the methyl formate may be distilled off. The ethyl formate is obtained in a similar manner by heating 46 parts by weight of ethyl alcohol (1 mol.) with 68 parts sodium formate (1 mol.) and 240 parts sodium bisulfate (2 mol.)

Example 2: 88 parts by weight of isoamyl alcohol are heated with 68 parts of sodium formate and 240 parts of sodium bisulfate for 10 hours up to 100° C., the mass being agitated all the while. The mass is allowed to cool down to 50° C. and the amyl formate formed is distilled off at 50° C. and under a reduced pressure of 40 to 50 mm. The product of reaction is allowed to cool down to common temperatures, whereupon the ester formed is decanted from the crystals that have separated out and the ester is purified by distillation. Crude fusel oil can be converted into an ester in an analogous manner.

What I claim is:

1. The herein described process of producing formic esters, consisting in heating a mixture of an alcohol, sodium formate and sodium bisulfate, and thereafter distilling off the resulting ester.

2. The herein described process of producing formic esters, consisting in admixing a suitable quantity of an alcohol with 68 parts of sodium formate and 240 parts of sodium bisulfate, heating the mixture, and thereafter distilling off the resulting ester.

3. The herein described process of producing formic esters, consisting in admixing 88 parts by weight of isoamyl alcohol, 68 parts of sodium formate and 240 parts of sodium bisulfate, heating the mixture for approximately ten hours to a temperature of approximately 100 degrees C., cooling the mixture down to approximately 50 degrees C., distilling off the resulting amyl formate at the temperature last mentioned under a pressure of from 40 to 50 mm., and finally removing and purifying the ester.

In testimony whereof I affix my signature in presence of two witnesses.

ALBERT WOLFF.

Witnesses:
     LOUIS VANDORY,
     BESSIE F. DUNLAP.